United States Patent [19]
Coll

[11] 3,882,278
[45] May 6, 1975

[54] INTERFACE DEVICE FOR USE WITH AN ALARM SYSTEM AND A TELEPHONE SYSTEM

[75] Inventor: Edward T. Coll, Philadelphia, Pa.

[73] Assignees: Martha H. Egly; Michael J. Manchester, Philadelphia, Pa.

[22] Filed: July 16, 1973

[21] Appl. No.: 379,610

[52] U.S. Cl. .................................. 179/5 R; 179/2 C
[51] Int. Cl. ............................................ H04m 11/04
[58] Field of Search ...................... 179/5 R, 2 C, 1 C

[56] References Cited

UNITED STATES PATENTS

| | | | |
|---|---|---|---|
| 2,709,251 | 5/1955 | Schmidt | 340/261 |
| 2,898,405 | 8/1959 | Eck | 179/175.2 C |
| 3,549,810 | 12/1970 | Driscoll et al. | 179/5 R |

*Primary Examiner*—William C. Cooper
*Assistant Examiner*—C. T. Bartz
*Attorney, Agent, or Firm*—Z. T. Wobensmith 2nd; Z. T. Wobensmith III

[57] ABSTRACT

The present device provides a means to connect, or interface, a telephone system coupler with an alarm system. The present device provides terminals which are energized when the alarm system is effective, for example only during the "night" hours, and further includes switching means to provide power to the telephone system coupler when said last mentioned terminals are energized; i.e., when the coupler system is to be activated in response to the alarm system being turned on. Further, the present system provides a timing circuit which keeps the necessary circuits connected through the telephone system coupler activated for the required period of time, and also provides a circuit, through a switching means, which connects an audio circuit to the telephone system coupler for transmission of audio signals into and through a normal telephone system.

8 Claims, 3 Drawing Figures

INTERFACE DEVICE FOR USE WITH AN ALARM SYSTEM AND A TELEPHONE SYSTEM

BACKGROUND OF THE INVENTION

1. Field of the Invention

This invention relates to an interface device of the type which connects an alarm system with a telephone system.

2. Description of the Prior Art

In the prior art, alarm systems have been employed to sound a bell outside of a building in the hope that a passing policeman, or citizen, would be alerted to the fact that the alarm system was tripped off and something was wrong inside the building. As the alarm system art developed, alarm signals have been transmitted directly to a jurisdictional police station, or some other monitor. Such systems have been an advance in the art, but have given rise to certain undesirable problems. For instance, in a large community, it is difficult for the metropolitan police to make provisions to monitor the enormity of stores, factories, and business locations, as well as all the homes whose owners would be desirous of such a monitor service. In addition, very often the alarm signal has been false; i.e., triggered by something other than an intruder. If the police spend a great deal of time investigating false alarms, then the system becomes self-defeating. By comparison, the present system enables a private organization (or possibly in a smaller community, the police force itself) to first be alerted to a suspected intrusion, and thereafter to actually listen to, or audio monitor, the location which is suspected of having an intruder incident. If, under the audio monitor, it is confirmed that an intruder is, or intruders are, present, the police can either be notified to investigate the intrusion (or go directly to the scene of the intrusion if the police are effecting the audio monitor).

SUMMARY OF THE INVENTION

The present interface system has a multi-terminal switch which is activated by a telephone system coupler, and which serves (among many things) to connect an audio signal transmission line to an audio signal transducer (microphone) located at the monitored scene. Said switch also connects control terminals of the telephone system coupler which enable the coupler to transmit signals of particular frequencies which in turn cause the system to operate. A timing signal is included in the circuitry which keeps said switch transferred for a predetermined time so that the user can effectively listen to the noises at the suspected location. However, the system will automatically (after a period of time) disconnect and restore the telephone lines to their normal usage.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Figure 1:
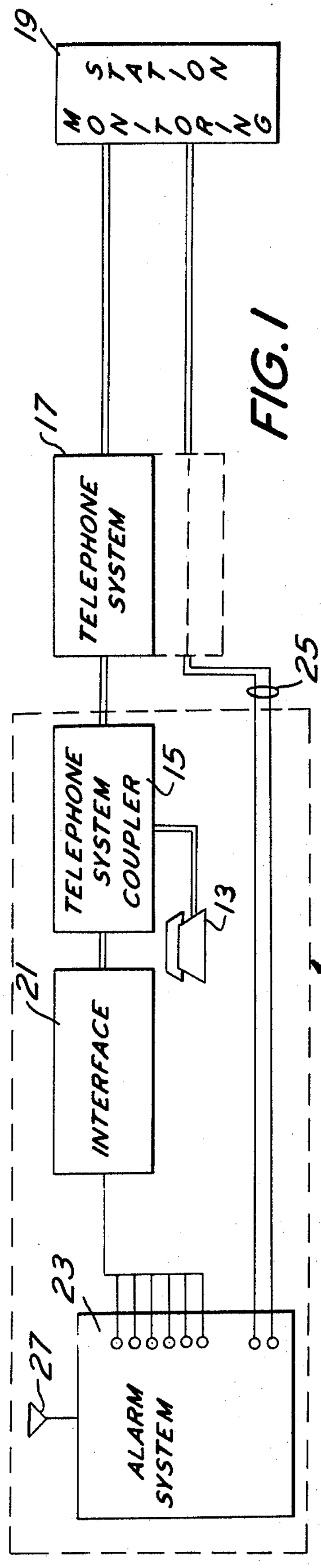
FIG. 1 is a block diagram of an alarm system, the present interface, the telephone system coupler, a normal telephone system, and the monitoring station.

Referring now more particularly to the drawings consider first FIG. 1, (which is a block diagram of an overall system) wherein there is shown a monitored location 11. The monitored location 11 might be a store, or a factory, or a residence or the like. The monitored location 11 has a telephone 13 located thereat for normal usage. The telephone 13 is connected through a telephone system coupler 15 for use with the remainder of the telephone system 17. A typical telephone coupler could be the Bell System or Western Electric KS-20445-L2, or may be a number of others. Ordinarily the coupler would not be present if an alarm system were not going to be employed.

The telephone system 17 is not normally connected to the monitoring station 19. This connection occurs only when the monitoring station dials the telephone number of the monitored location 11. On a hang-up or disconnect there is no connection between the telephone system 17 and the monitoring station 19. It should be noted from FIG. 1 that the interface 21 is connected to the telephone system coupler 15 as well as to the alarm system 23. It should be further noted that the alarm system 23 is connected by the intruder signal lines 25 to the monitoring station 19, through a section of the telephone system (shown in phantom). It should be understood that the leased intruder signal lines 25 may be simply located along the poles of a telephone system, or they may be located along the poles of a power line. On the other hand, these intruder signal lines indeed may go through the telephone system central office per se.

Assume that the "night" hours are at hand and that the alarm system is in effect. If an intruder enters the premises of the monitored location 11, the alarm system 23 will transmit a signal along the lines 25 to the monitoring station 19. Such a signal might indicate that a door has been improperly opened, or a window tampered with, etc. Before sending the police to investigate, the monitoring personnel will want to verify that the alarm signal is valid, and that it is necessary to request police action.

Since the alarm system is in a standby status, the interface 21 will supply power to the coupler 15 (as will be explained more fully hereinafter) and therefore the coupler 15 is ready to operate. With the use of the present invention, a person at the monitoring station, having been alerted to the possible intrusion, dials the telephone number of telephone 13, which is located at the suspected station 11. The local telephone 13 is not caused to ring, since such ringing might alert the intruder. The 20HZ frequency signal which would ordinarily cause the telephone to ring is interrupted by a mechanism present in the telephone coupler. However, the 20HZ frequency signal is transmitted on the telephone line as though the telephone were going to ring and this ringing signal is routed to a 20HZ detector. The detection of the ringing signal causes the telephone line to be seized; i.e., connected to a transformer-amplifier arrangement so tht speech can be transmitted from an audio transducer instead of from the local telephone set. The detected ringing signal also initiates the generation of an answer signal (in the preferred embodiment the answer signal is at 2125 HZ). This answer signal is heard by the personnel at the monitoring station, and this answer signal indicates that the suspected location has been contacted. The monitoring personnel next send an actuating signal or a particular signal. In the preferred embodiment, the particular signal is a 1475 HZ signal. This frequency signal is the tone heard when the number 3 button on a touch tone telephone is depressed. The actuating signal sets a tone detector flip-flop and the setting of the tone detector flip-flop causes the interface to go into its second phase of operation.

When the tone detector flip-flop is set, the interface device closes a plurality of switches (as will be more fully explained hereinafter) to enable the microphone 27, or some other audio transducer, to listen to the activity at the location which is suspect of a break-in. If the monitoring personnel verify the break-in by what is heard at the suspected location, the police can then be notified; or in the case of the police acting as the monitoring personnel, they will verify the presence of intruders and proceed to the location experiencing the break-in.

The invention disclosed and claimed herein is the interface mechanism. However, in order to better understand it, we should consider FIG. 2, which is a limited schematic of a Western Electric KS-20445-L2 coupler. The complete schematic of said coupler is shown in a publication entitled "Voice Connecting Arrangements, CAU, SU3 and SU6 Interface Specifications, Nov. 1969" and copyrighted by American Telephone and Telegraph Company, 1969.

Figure 2:
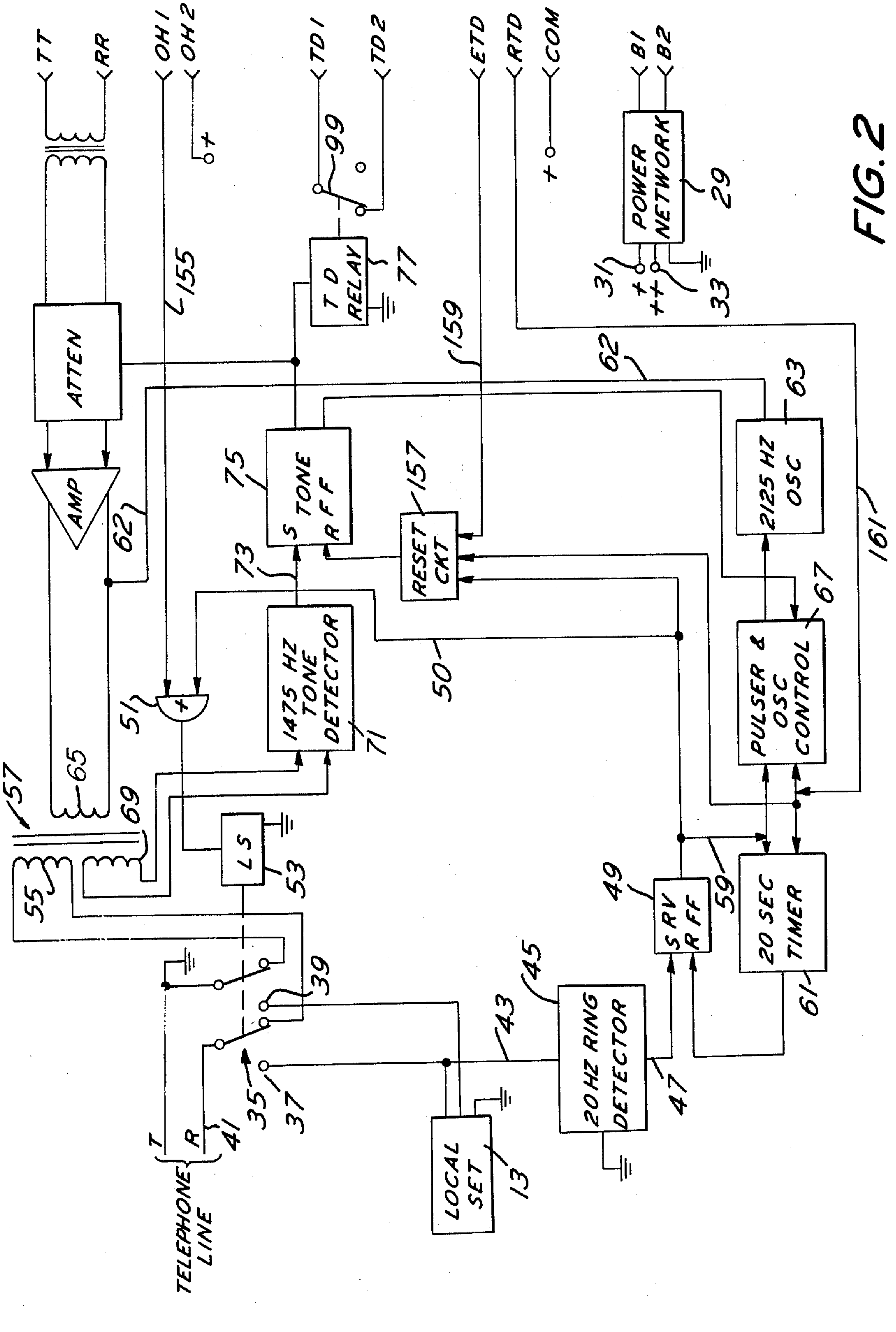
FIG. 2 is a modified schematic of a Western Electric KS20445 coupler.

The present interface, when it is activated by the alarm system, provides power to terminals B1 and B2, shown in FIG. 2. The power provided to terminals B1 and B2 is further directed to the power network 29, whereat the network acts to provide the power to the terminals 31 and 33. Terminal 31 is shown with one positive sign indicating lesser positive potential than the potential shown at terminal 33. It should be understood, although it is not specifically shown, that power is provided from the power network 29 to each of the logic blocks shown in FIG. 2, so that the structures represented by the blocks operate as they are described in the above mentioned publication.

Briefly, in accordance with our description above, at the time that the monitoring personnel dialed the phone number of the local set 13, the relay straps 35 were in their de-energized position, making contact with the points 37 and 39. Accordingly, the ringing signal transmitted on the line 41 is transmitted through the relay to point 37, along the line 43, to the detector 45. The detector, after having detected the 20HZ signal, provides an output signal on line 47 to set the ring-up flip-flop 49. When the ring-up flip-flop 49 is energized, it provides a signal to the OR gate 51, whose output in turn energizes the (LS) line seize relay 53. When the LS relay 53 is energized the transfer straps 35 are transferred to connect to the telephone line T of FIG. 2 to complete the ringing circuit to the 1475 HZ tone detector.

It should be noted that the output from the ring-up flip-flop 49 is also transmitted along the line 59 to start the 20-second timer 61, as well as to cause the 2,125 HZ oscillator 63 to be activated. After 20 seconds the initial LS signal on line 50 is terminated. It beomes apparent then that there will be a 2,125 HZ signal applied along line 62 to the winding 65 of transformer 57, and that this signal will be available for a 20-second period while the 20-second timer 61 has been activated. Actually, the signal on line 59 is passed through the pulse and oscillator control circuit 67 which causes the 2,125 HZ signal to be transmitted in pulse form to the winding 65. Therefore, during the 20-second time period, after a monitoring person has dialed the telephone number of the local set 13, there will be a pulsating 2,125 HZ signal (an answer signal) transmitted on the telephone line to the monitoring station. When the monitoring personnel hear this 2,125 HZ signal, it is understood that the monitored station, where the intrusion is suspected, has been contacted. Now the monitoring personnel send back a signal in the form of a 1,475 HZ signal, which can be effected by pushing the number 3 button on a touch tone telephone or by some other means. This 1,475 HZ signal is transmitted to the winding 55 and induces a similar signal in the winding 69. The 1,475 HZ signal is detected by the detector 71, which in turn provides an output signal on line 73 to set the tone flip-flop 75. When the tone flip-flop 75 is set, it in turn energizes the TD relay 77 which transfers its points to connect TD1 to TD2. It is at this point that we should consider how the interface now connects the coupler shown in FIG. 2 to the alarm system so that there can be audio signals transmitted along the lines TT and RR (shown in the coupler, FIG. 2) and on out along the telephone lines labelled T and R on the left-hand side.

Figure 3:
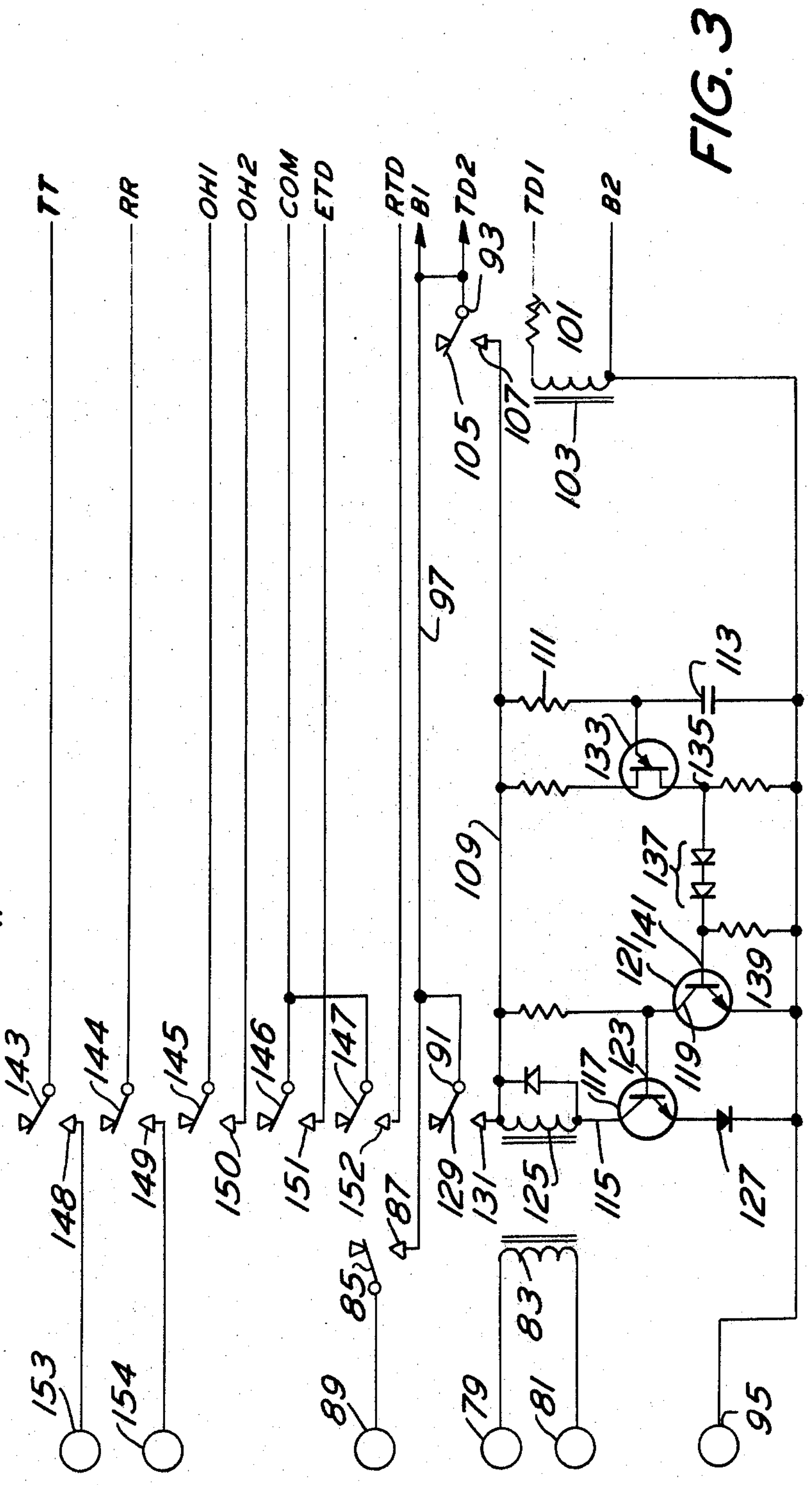
FIG. 3 is a schematic diagram of the present interface.

Consider FIG. 3 which shows the schematic of the inteface. Consider for the moment that we have not arrived, in point of time as just described earlier and, in fact, the alarm system has just been turned on for the "night" by the last person leaving the monitored station; e.g., the premises of the store. When the alarm system is turned on, power is provided across the terminals 79 and 81. When power is provided on the terminals 79 and 81, the relay 83 is energized which in turn closes, or transfers the relay strap 85 so that it is connected with point 87. It should be understood that the terminal 89 is constantly connected to a relatively large positive potential. Accordingly, when the relay strap 85 is connected to the point 87, there is positive potential applied to terminal 91 and terminal 93, as well as terminal B1. At the same time, it should be understood that terminal 95 is continually subjected to a relatively negative potential when compared to terminal 89, and hence there is a negative potential applied to the terminal B2. The terminals B1 and B2 are the same two terminals B1 and B2 that are shown in FIG. 2. Accordingly, when the "night" condition of the alarm system is turned on, there is power supplied to terminals B1 and B2 of not only the interface circuit shown in FIG. 3 but also to the terminals B1 and B2 shown in FIG. 2.

When we described the operation of the circuitry in FIG. 2, we followed the description to the point where the TD relay 77 was energized, connecting the point TD1 to point TD2. The same points, TD1 and TD2, are shown in FIG. 3; and when these points have been connected, there is current flow from the terminal 89, through the relay strap 85, to terminal 87, along the line 97 through the point TD2, through the relay strap 99 in FIG. 2, back through the point TD1 in FIG. 3, through the resistor 101, to energize the relay 103. When the relay 103 is energized, the relay strap 105 is transferred to connect to the point 107, thereby providing a positive potential to the line 109.

When a positive potential is applied to line 109 a number of things happen. First of all, there is current flow through the resistor 111 to commence charging up the capacitor 113. At the same time there is positive potential applied to the collector 115 of the transistor 117 and positive potential applied to the collector 119 of the transistor 121. The positive potential applied to the collector 119 is also applied to the base 123 of transistor 117, and since transistor 117 is an NPN transistor, that transistor is rendered in a conducting state. Accordingly, current passes from the line 109 through the relay 125 and through the transistor 117 through the diode 127 to terminal 95. It follows that the relay 125 is energized, which causes the transfer strap 129 to be transferred and put in connection with the point 131. It will be recalled that there was a positive potential applied to the line 97 and hence the transfer of the relay strap 129 acts as a hold circuit for the relay 125. Accordingly the relay 125 will be energized so long as the transistor 117 conducts.

During the time that the foregoing is taking place, there is a positive potential applied across the terminals of the uni-junction transistor 133. When the potential on the capacitor 113 gets to a predetermined percentage of potential across the terminals of the uni-junction transistor 133, a threshold signal is reached and the uni-junction transistor 133 will fire, or conduct, and this will provide a relatively positive potential at the terminal 135.

When the uni-junction transistor 133 conducts, providing the relatively positive potential to terminal 135, the voltage divider made up of the diodes 137 and the resistor 139 will provide a relatively positive potential to the base 141 of the transistor 121. Hence the transistor 121 will conduct. Since the voltage drop across the conducting transistor is relatively small, the collector 119 will go relatively negative approaching the potential of terminal 95, and hence the base 123 of the transistor 117 will go negative, thereby turning off transistor 117. As indicated earlier, when the transistor 117 is turned off, the relay 125 becomes de-energized and the hold circuit drops out.

It becomes apparent then that the relay 125 is energized for as long a time as the RC circuit, made up of the resistor 111 and 113, takes to build up a sufficient charge on the capacitor 113 to fire the uni-junction transistor 133. Obviously, the values of the resistor 111 and 113 can be chosen to provide whatever time is necessary.

Now let us consider what happened during the time that the relay 125 was energized. When the relay 125 is energized, each of the relay straps 143 through 147 is transferred to be respectively connected to the points 148 through 152. When the relay straps 143 and 144 are transferred, the lines TT and RR are connected to the terminals 153 and 154. The terminals 153 and 154 are connected through the alarm system to the microphone 27 in FIG. 1. Accordingly, the microphone is connected to the telephone line identified by T and R in FIG. 2, and the monitoring personnel can listen to what is taking place at the monitoring station.

The foregoing is only true if some other actions take place simultaneously. When the relay 125 was energized and the strap 145 was transferred to make connection to point 150, the terminals OH1 and OH2 were connected one to the other. If we briefly look at FIG. 2, we find that there is a positive potential applied to OH2 which signal is thus applied through the relay strap 145 to the point 150 to be returned through the OH1 terminal, along the line 155, to the OR gate 51. The output signal from the OR gate 51 energizes the LS relay 53 to transfer the straps 35 so that the winding 55 of the transformer 57 will be in a position to receive the audio signals transmitted to the lines TT and RR shown in FIG. 2. It will be recalled that the LS relay dropped out after 20 seconds from the time it was initially picked up in response to ring detector output. Now when the relay 125 is energized the LS relay will be energized for as long a time as relay 125 is energized.

Further in examining the results of energizing relay 125 we find that the common (COM) terminal which is connected to a positive potential in FIG. 2 is connected (FIG. 3) through the relay strap 146 and terminal 151 to the ETD terminal as well as through strap 147 and 152 to the RTD terminal. Now the ETD terminal and the RTD terminal provide control signals and are the same ETD terminal and RTD terminal shown in FIG. 2. Accordingly, then, there is a control signal applied to the reset circuit 157 in FIG. 2, serving as an "and" gate, by virtue of the potential on line 159 coming from the ETD terminal shown. In a like manner, there is a positive potential or control signal applied along line 161 from the RTD terminal. This last signal serves to turn off the 20-second timer and thereby prevents the reset of the RU flip-flop as well as turn off the oscillator control 67 to terminate the 2125 HZ signal. As long as the RTD signal is present the 20 second timer will not operate to provide a reset pulse to the RUFF 49.

The output of the reset circuit 157 in FIG. 2 resets the tone flip-flop 75 and hence the TD relay is de-energized. The de-energization of the TD relay 77, and therefore the return of the strap 99 to its unconnected position, disconnects the terminals TD 1 from TD 2. However, it should be borne in mind that the relay 125 has its own holding circuit and the disconnecting of TD 1 from TD 2 has no effect on de-energizing relay 125. Relay 125 becomes de-energized when the uni-junction transistor 133 in FIG. 3 is fired. If during the time period provided by the RC time circuit, made up of the resistor 111 and capacitor 113, the monitoring personnel have not made a decision as to whether or not the premises that they are monitoring has, in fact, an intruder, the circuit will deactivate, i.e., relay 125 will become deenergized. Accordingly when relay 125 deenergizes the RTD signal will be terminated and the 20 second timer will commence clocking a 20 second period. The foregoing goes into effect because the RU flip flop 49 has remained in the set position since the output from the 20 second timer was not generated to reset it. Accordingly, the monitoring personnel have 20 seconds after the deactivation of relay 125 to reinstitute the seizure of the telephone line without redialing the telephone number. If the decision is made to remonitor the protected premises within the 20 seconds following deactivating the monitoring personnel simply energize the 1475 HZ signal once again, and this signal provides an output on line 73 which sets the tone flip-flop 75 which re-energizes the TD relay 77 and the procedure just described above starts all over again.

I claim:

1. An interface device to be used to connect an alarm system to a telephone system coupler comprising in combination a first source of power adapted to be activated during predetermined hours, means connecting said first source of power to said telephone system coupler to provide power thereto, first signal switching means having first and second terminals, first circuitry means connecting said first and second terminals to said telephone system coupler to activate said first switching means in response to a particular signal being transmitted to said telephone system coupler, first timing circuitry means connected to said first and second terminals to provide a threshold signal after a predetermined time that said particular signal has been applied to said telephone system coupler, second switching means connected to receive said threshold signal and further connected to said first switching means to cause said first switching means to be turned off in response to said threshold signal being generated, second circuitry means connected to said first switching means to enable a signal to be applied to said telephone system coupler which in turn causes it to seize a telephone line connected thereto in response to said first signal switching means being switched, third circuitry means connected to said first signal switching means and to said alarm system as well as to said telephone system coupler to enable audio signals to be transmitted from said alarm system through said first signal switching means, through said telephone system coupler to said seized telephone line, fourth circuitry means connected to said first signal switching means to provide control signals through said first signal switching means to said telephone system coupler, and fifth circuitry means including second timing circuitry means connected to both said first circuitry means and said fourth circuitry means whereby at least one of said control signals is connected to disconnect said second timing circuitry means while said first signal switching means are activated and whereby said second timing circuitry means is connected to disenable said first circuitry means from passing said particular signal after a given period of time during which said second timing circuitry is activated.

2. An interface device as defined in clain 1 wherein said means connecting said first source of power to said telephone system coupler includes a first relay switching means which is energized by said first source of power.

3. An interface device as defined in claim 1 wherein said first signal switching means includes a second relay switching means having a plurality of transfer straps and associated points and a first electronic switching means serially connected thereto to energize said second relay switching means.

4. An interface device as defined in claim 3 wherein said plurality of transfer straps and associated points includes first transfer strap and point means and said third circuitry means is connected through said first transfer strap and point means to be connected to both said alarm system and said telephone system coupler.

5. An interface device as defined in claim 3 wherein said plurality of transfer straps and associated points includes second transfer strap and point means and said second circuitry means is connected therethrough to enable said telephone line to be seized.

6. An interface device as defined in claim 3 wherein said plurality of transfer straps and associated points includes third transfer strap and point means and said fourth circuitry means is connected therethrough to provide said control signals.

7. An interface device as defined in claim 1 wherein said first timing circuitry means includes a resistor-capacitor circuit and said second switching circuit is a second electronic switching circuit having a control element and said control element is connected to said resistor-capacitor circuit so that when said capacitor is charged to a threshold value said second electronic switching circuit conducts.

8. An interface device as defined in claim 7 wherein said first signal switching means includes a second relay means serially connected to a first transistor to be energized when said first transistor conducts and further includes a second transistor whose collector element is connected to the base element of said first transistor and said second electronic switching circuit has an output element connected to the base element of said second transistor whereby when said second electronic switching circuit conducts said first transistor becomes non-conducting.

* * * * *